April 21, 1925.
C. R. LOCKLIN
WINDSHIELD WIPER
Filed March 26, 1921
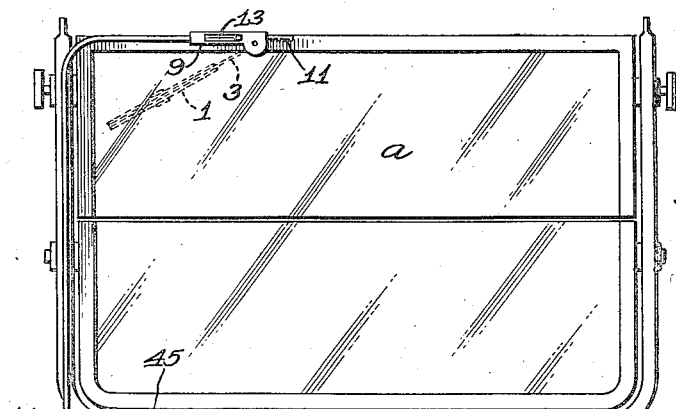
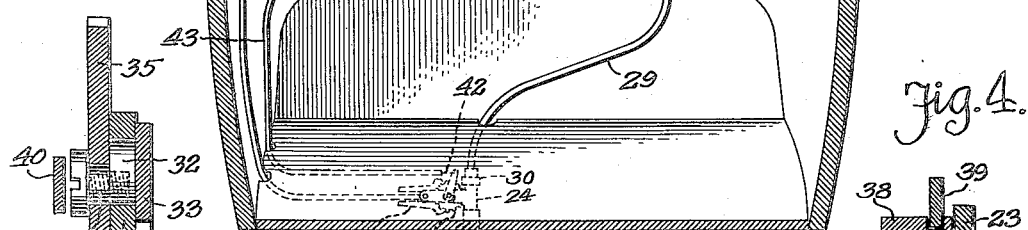
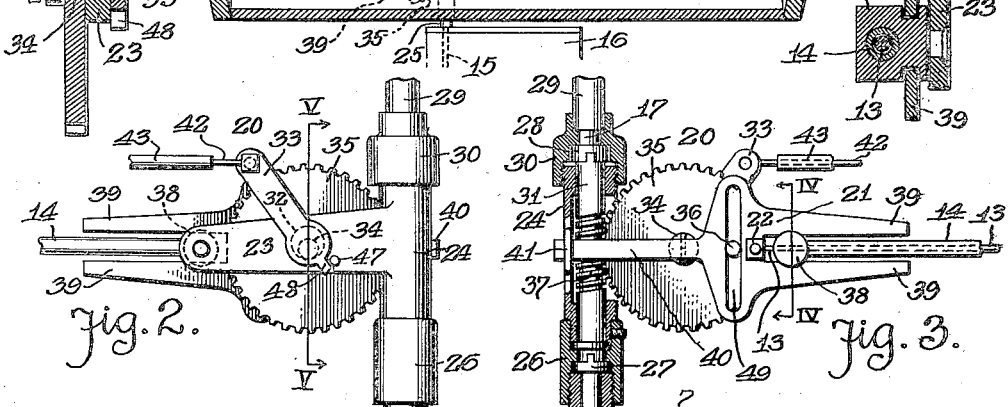
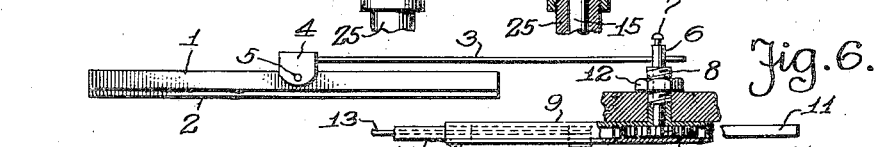
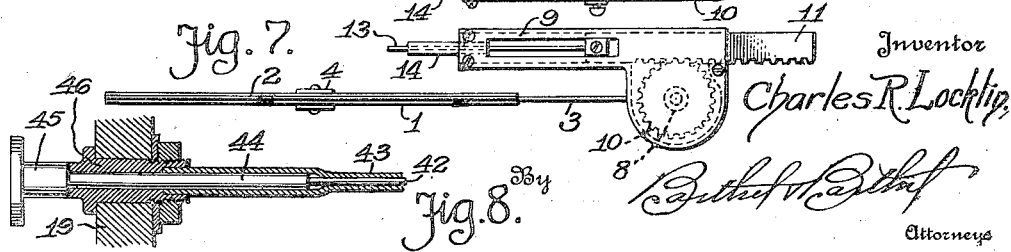
Inventor
Charles R. Locklin
Attorneys Patented Apr. 21, 1925.

1,534,276

UNITED STATES PATENT OFFICE.

CHARLES R. LOCKLIN, OF DETROIT, MICHIGAN.

WINDSHIELD WIPER.

Application filed March 26, 1921. Serial No. 456,028.

*To all whom it may concern:*

Be it known that I, CHARLES R. LOCKLIN, a citizen of the United States of America, residing at Detroit, in the county of Wayne and State of Michigan, have invented certain new and useful Improvements in Windshield Wipers, of which the following is a specification, reference being had therein to the accompanying drawings.

This invention relates to cleaning or wiping devices for vehicle windows and the like, to provide clear vision in stormy weather, and more particularly to automotive or power driven devices commonly known as windshield wipers. It is an object of the invention to provide simple, cheap and efficient means for transmitting motion from a driven part of the vehicle to operate a wiping device, and to so construct and arrange such transmitting means that the same may be readily installed upon motor vehicles as commonly constructed and without the necessity for making any changes in such vehicle construction. A further object is to provide means for taking off motion from a power transmitting line of a motor vehicle, which means may be such as to be readily insertable as a unit in the line and to provide a high reduction in speed and translation of motion from a rotary to a reciprocating movement. It is also an object to provide a simple, compact, light and efficient wiper construction embodying reciprocable means for swinging a wiper arm, and to provide certain other new and useful features in the construction, arrangement and combination of parts, all as hereinafter more fully described.

With the above and other ends in view, the invention consists in the matters hereinafter set forth and more particularly pointed out in the appended claims, reference being had to the accompanying drawing in which—

Figure 1 is a transverse section of a vehicle body showing a windshield in place thereon, and a device illustrative of the invention applied thereto, said figure being illustrative of an application of the invention in use;

Fig. 2 is a detail of means for taking off motion from a driven part of the vehicle to operate a wiping device, said means being shown in elevation and as a unit insertable in a motion transmitting line;

Fig. 3 is a similar detail of said unit showing the side of the same opposite that shown in Fig. 2 and with parts in section;

Fig. 4 is a sectional detail substantially upon the line IV—IV of Fig. 3;

Fig. 5 is a detail showing a transverse section substantially upon the line V—V of Fig. 2;

Fig. 6 is a detail of wiper mechanism as applied to a windshield and showing the same in elevation with parts in section to more clearly disclose the construction;

Fig. 7 is an elevation of Fig. 6; and

Fig. 8 is a sectional detail of a control button.

The device for wiping or cleaning the glass surface, such as the panel —a— of a windshield which is indicated as a whole at A, comprises a bar or strip 1 to which is secured a rubber or other suitable edge strip 2 to engage and wipe the surface of the glass, said bar being carried by a spring arm 3 which is pivotally attached at one end to the bar intermediate the ends thereof by a suitable clip 4 and transverse pivot pin 5. The opposite end of said arm which is preferably a straight spring steel wire, is adjustably secured to the outer end of a short shaft 6 in any suitable manner as by providing a transverse hole in the shaft to receive the wire and securing the same therein by means of a set screw 7 in the shaft, said shaft being mounted for free rotative movement, in a bearing sleeve 8 which is preferably formed integral with a casing 9 for a gear 10 which is secured upon the inner end of the shaft 6, and for a rack bar 11 which is in mesh with the gear and is guided in its longitudinal movement in the casing, said casing forming a guideway for the rack. This casing 9 is secured against the inner side of the windshield frame, preferably the horizontal portion of the frame above the panel —a—, by providing an opening in the frame to receive the bearing sleeve 8 which is screw-threaded at its outer end to receive a nut 12, for engaging the outer side of the frame. The casing is thus clamped firmly against the inner side of the frame with the shaft 6 carrying the wiper bar 1 projecting through the frame and the wiper in contact with the outer side of the panel to swing in contact therewith as the shaft is turned and the arm 3 oscillated by the longitudinal reciprocation of the rack 11.

To reciprocate the rack 11, a flexible driving member, such as a wire 13 is secured in any suitable manner as by a set screw, to an end of the rack and this wire extends through a flexible tube 14 which is made fast at one end to the casing 9 in any suitable manner. This driving wire and its guide tube 14 are extended to the side of the windshield and downwardly to any convenient driven part of the vehicle from which motion may be taken off for reciprocating said wire within its guide tube.

As illustrated, power for operating the wiper is taken from a shaft 15 which projects from the casing 16 of the change speed power transmitting mechanism, which shaft is commonly provided for driving the flexible shaft 17 leading upwardly to a speedometer 18 on the instrument board 19 of the car, but it will be understood that the mechanism for reducing speed and translating the rotary motion of the shaft into a reciprocating motion for driving the wiper, and which mechanism is indicated as a unit at 20 insertable in this power line or between the projecting end of the shaft 15 and the flexible shaft 17, may be installed at any other convenient place in such power line or connected to any other suitable driven shaft of the vehicle.

The power reducing and motion translating unit 20 comprises a cross-head 21 to which the lower end of the wire is attached at 22 and this crosshead is carried by a bracket arm 23 on a tubular casing or sleeve 24 which is connected to and rigidly supported by a hollow stud 25 on the casing 16 through which stud the shaft 15 extends, said stud being screwthreaded to receive a coupling sleeve 26 rigidly secured in any suitable manner to the lower end of the tubular member 24. The shaft 15 is provided with the usual coupling head 27 which is adapted in the usual construction to cooperate with a like head 28 on the lower end of the flexible shaft 17 leading to the speedometer, said shaft 17 being extended through the usual flexible tube 29 which is provided with a coupling socket 30 adapted to engage the stud 25 and hold the heads 27 and 28 in interlocked engagement when motion is being transmitted in the usual manner for driving the speedometer. The unit 20 is inserted between the shafts 15 and 17 to take off motion therefrom, by detaching the socket 30 from the stud 25 and securing one end of the member 24 to the stud by the coupling sleeve 26 and engaging the socket 30 with the opposite end of the said member 24, said engagement effecting an interlocking engagement of the head 28 with a formed end on a worm shaft 31 mounted in bearings in the supporting sleeve 24 and also an interlocking engagement of the head 27 with a suitably formed lower end of said worm shaft.

A bearing opening is provided in the supporting arm 23 for a stud 32 on an arm 33, and this stud is formed at its free end with an eccentric portion forming a journal 34 upon which a large worm wheel 35 is mounted. One side of the supporting sleeve 24 is cut away to permit the worm wheel 35 to project therein into engagement with the worm of the worm shaft 37, the peripheral teeth of the worm wheel being brought into and moved out of engagement with the worm by a movement of the wheel toward and from the worm shaft, which movement is effected by turning the stud 32 within its bearing by means of the arm 33 and thus shifting the journal 34 of the wheel relative to the axis of its support or stud 32.

Projecting from one side of the worm wheel 35 at a distance from its axis of rotation is a pin 36 to engage a transverse slot 49 in the cross head 21 and from a crank connection for reciprocating the cross head which is guided in such reciprocation by means of a block 38 rigidly secured to the outer end of the arm 23 and engaging a longitudinal slot or guideway formed by two parallel arms 39 on the cross head and also guided at its opposite end by a longitudinal arm 40 engaging a suitable bearing 41 therefor on the tubular casing or supporting member 24. The lower end of the flexible casing 14 for the wire 13 is rigidly secured in any suitable manner to the block 38 and is therefore rigidly and stationarily connected to the unit 20, forming a guide for said motion transmitting wire 13 between said unit and wiper casing 9.

In order that the arm 33 may be conveniently operated to shift the worm wheel 35 into and out of gear with its worm; so that the operation of the wiper may be stopped or started at any time by the driver of the vehicle, a flexible wire 42 is secured at one end to the end of said arm, and this wire is extended through a flexible tube or guide casing 43 to the instrument board 19 of the car where the stem 44 of a push and pull button 45 is secured to the wire, said button being mounted within a suitable bushing 46 secured within a hole in the instrument board, in any suitable manner, the upper end of the guide tube 43 being rigidly secured in any desired manner to said bushing.

As shown in Fig. 2 a stop pin 47 may be provided on the arm 23 to be engaged by a lug 48 on the arm 33 to limit the turning movement of said arm and adjustment of the gear 35 caused thereby.

A very simple, efficient and compact mechanism for taking off motion from a driven shaft for driving the wiper, is provided in the construction shown and which mechanism is in the form of a unit readily attachable to a driven shaft or insertable in a motion transmitting line, the construction being such as to particularly adapt the unit to be inserted in the line for transmitting motion to a speedometer as such lines are commonly constructed and arranged on motor vehicles, it only being necessary to disconnect the usual coupling for such lines and insert the unit between the coupling parts. Any changes in the vehicle as commonly constructed are therefore obviated and any unskilled person may install the device.

Further, the worm and worm gear gives a high reduction in speed to provide a positive powerful drive and the non-rotatable, non-extensible and non-compressible driving wire for transmitting motion to the wiper, provides a very strong and positive means for transmitting motion and which wire, by reason of being guided within its tube, will transmit motion along a circuitous path, thus permitting of bending the guide tube as desired in order to place it in the most inconspicuous position in installing the device upon a motor vehicle or to permit of building it into the body of enclosed cars.

For swinging the wiper, the reciprocating motion of the wire is again translated into a rotary motion by very simple means comprising the rack 11 and pinion 10, both enclosed within a compact, inconspicuous casing which is readily applicable to windshields of various forms and constructions.

The driving shaft 15 may be any suitable shaft which is power driven and the worm shaft 31 forms a continuation of the driving shaft, being directly connected thereto to always rotate therewith so that whenever the gear 35 is thrown into mesh with the worm of said shaft 31, a comparatively slow reciprocating movement will be imparted to the driving wire 13 through the cranked connection of the gear with the cross head.
Convenient means for throwing the gear into and out of mesh with its worm is provided by the wire 42 which may be led in a circuitous path to the instrument board where it may be conveniently operated by the driver of the car.

Obviously changes may be made in the construction and arrangement of parts, within the scope of the appended claims without departing from the spirit of the invention and I do not therefore limit myself to the particular construction shown.

What I claim is:—

1. In mechanical power transmission for driven instruments mounted upon vehicles, the combination with a vehicle provided with a transmission, a flexible speedometer shaft connected with said transmission, a motion translating device insertable as a unit in said speedometer shaft line to translate the rotating motion into reciprocating motion, and a linear push and pull member for conveying the reciprocating motion to a remote point for doing work.

2. In mechanical power transmission for driven instruments mounted upon vehicles, the combination with a vehicle provided with a rotating part, of a power transmission shaft connected up with the rotating part to drive an instrument, a motion translating device insertable as a unit in the power transmission line for converting the rotating motion of the power shaft into a reciprocating motion to operate another instrument, and a flexible line or push and pull member for transmitting said reciprocating motion to a remote point for use in said instrument.

3. In mechanical power transmission for driven instruments mounted upon vehicles, the combination with a vehicle provided with a rotating part, and means for translating the rotary motion into reciprocating motion, including a driving member, a driven gear, a suitably guided crosshead, crank connections between the crosshead and the gear, and a push-and-pull wire connected with the crosshead.

4. In mechanical power transmission for driven instruments mounted upon vehicles, the combination of a vehicle provided with a rotating part, and a motion translating device including a rotating driving member coupled up with said rotating part, a suitably journalled driven gear shiftable transversely of its axis to engage or disengage the same from the driving member, a crosshead suitably guided, a crank connection between the driven gear and the crosshead, and means for shifting said gear to connect or disconnect it with the driving member, including a push-and-pull wire that may be carried to a remote point.

5. In mechanical power transmission for driven instruments mounted upon vehicles, the combination with a vehicle provided with a rotating part, a motion translating device including the driving member that couples up with the rotating part, a driven member supported upon a shiftable journal to move the driven member into or out of engagement with the driving member, a crosshead suitably guided, connections between the driven gear and the crosshead, a push-and-pull wire for shifting the driven gear toward or away from the driving member, and a tube for enclosing the same, said wire and tube being flexible and leading to a remote point.

6. In mechanical power transmission for driven instruments mounted upon vehicles, the combination of a vehicle provided with a rotating part, and a motion translating device including a driving member coupled up with said rotating part, a flexible push and pull wire, a driven gear rotatably supported upon an eccentric, a suitably guided crosshead, connections between the crosshead and the gear, a lever connected to the flexible push-and-pull wire and the eccentric for shifting the eccentric, said push and pull wire running to a remote point.

In testimony whereof I affix my signature in presence of two witnesses.

CHARLES R. LOCKLIN.

Witnesses:
LEWIS E. FLANDERS,
ANNA M. DORR.